UNITED STATES PATENT OFFICE.

SVEND M. MEYER AND WILLIAM JAMES, OF BROOKLYN, NEW YORK, ASSIGNORS TO MAGNO STORAGE BATTERY CORPORATION, OF NEW YORK, N. Y., A CORPORATION OF DELAWARE.

ALLOY.

1,425,330.   Specification of Letters Patent.   Patented Aug. 8, 1922.

No Drawing.   Application filed June 23, 1921.   Serial No. 479,801.

*To all whom it may concern:*

Be it known that we, SVEND M. MEYER and WILLIAM JAMES, citizens of the United States, and residents of the borough of Brooklyn, county of Kings, and city and State of New York, have invented certain new and useful Improvements in Alloys, of which the following is a specification.

Our present invention comprises an alloy of metal which we find possesses physical and chemical properties, which render it useful for many different purposes. The alloy comprises, as essential ingredients, tin, antimony, lead and zinc. The proportions of these essential ingredients may be varied somewhat to satisfy particular requirements but the composition which we have found especially suitable for many purposes contains in the neighborhood of 50% tin, 25% lead, 17% zinc and 8% antimony. This composition is only slightly acted on by concentrated sulphuric acid at ordinary temperatures and possesses fair electric conductivity. It has a theoretical specific gravity of about 8.251; melting point between 480 and 500 degrees Fahrenheit. The alloy, in substantially the proportions stated, constitutes a eutectic composition so that it may be melted and cast without alteration of its composition. It is well suited to being rolled into sheets, blocks or bars and, hence, may be used, for example, in the form of storage battery electrodes.

While no claim is made herein to the particular process of compounding the alloy, we may state that a satisfactory process for its manufacture is as follows:—The tin, lead and antimony are first thoroughly alloyed together by heating to nearly a cherry red under charcoal. The entire surface of the metal or alloy during this time is covered with the charcoal as otherwise the tin would burn where exposed to the oxygen of the air. When the tin, lead and antimony have been thoroughly alloyed, the zinc is introduced and stirred under the charcoal. The alloy, containing all the ingredients, is then allowed to cool down to the proper casting heat before skimming off the charcoal for the finished alloy.

We claim:—

An alloy comprising, as essential ingredients, in the neighborhood of 50% tin, 25% lead, 17% zinc and 8% antimony.

SVEND M. MEYER.
WILLIAM JAMES.